United States Patent [19]

Hashimoto

[11] 4,302,076
[45] Nov. 24, 1981

[54] OPTICAL ELEMENT MOUNTING DEVICE

[75] Inventor: Shigeru Hashimoto, Yokohama, Japan

[73] Assignee: Canon Kabushiki Kaisha, Tokyo, Japan

[21] Appl. No.: 24,254

[22] Filed: Mar. 27, 1979

[30] Foreign Application Priority Data

Apr. 12, 1978 [JP] Japan .............................. 53-48137[U]

[51] Int. Cl.³ .............................................. G02B 7/02
[52] U.S. Cl. ................................................... 350/252
[58] Field of Search ....................... 350/242, 251–254, 350/256–257, 69; 354/286

[56] References Cited

U.S. PATENT DOCUMENTS

| 499,266 | 6/1893 | Voorhees | 277/222 |
|---|---|---|---|
| 1,161,078 | 11/1915 | Slade | 403/DIG. 7 |
| 2,497,147 | 2/1950 | Washam | 350/252 |
| 3,351,408 | 11/1967 | Krewalk | 350/69 |
| 3,671,108 | 6/1972 | Kilgus | 350/253 |
| 3,904,276 | 9/1975 | Whitaker et al. | 350/252 |

FOREIGN PATENT DOCUMENTS

| 23980 | 11/1913 | Norway | 350/69 |
|---|---|---|---|
| 382 | of 1904 | United Kingdom | 350/252 |

Primary Examiner—William H. Punter
Attorney, Agent, or Firm—Toren, McGeady & Stanger

[57] ABSTRACT

A lens holding assembly includes an annular resilient member which is arranged within the inner circumferential surface of a lens barrel between confronting faces of adjacent lenses or between a lens and a lens carrying ring. The resilient member has a discontinuous annular configuration and portions thereof which are bent in the axial direction of the lens barrel in order thereby to provide desired resilient mounting forces for the assembly.

3 Claims, 16 Drawing Figures

OPTICAL ELEMENT MOUNTING DEVICE

BACKGROUND OF THE INVENTION

The present invention relates generally to optical assemblies and more particularly to a lens mounting assembly capable of mounting and holding lenses in predetermined positions within a lens barrel.

Conventional methods and structures for firmly mounting lens systems in predetermined positions within a lens barrel have included a variety of differing techniques. In such conventional devices, it has been known to hold the lenses in place by means of retaining members. Additionally, caulking of an inner cylinder of the lens barrel in which the lenses are to be affixed has also been utilized for mounting the lenses. A further method or device for holding lenses in place within a lens barrel involves the use of resilient or elastic members interposed between one lens and another or between a part of the lens barrel and the lenses mounted therein.

In one such conventional method where a retaining ring is utilized to hold the lens member in place within the lens barrel, tightening forces created when such a retaining ring is tightly engaged within the lens barrel will tend to create stresses upon the lens members thereby causing distortion of the lenses and deviation thereof from predetermined desired positions. Furthermore, because of the necessity for accurate lens location, high precision in the machining of parts is required thereby increasing the cost of manufacturing and processing of the lens assembly.

Where caulking is used to affix the lenses in place, the physical force inflicted upon the lens by the caulking process tends to damage or distort the lenses. Furthermore, in structures where a lens is located deep inside of a lens barrel, the caulking and assembly procedures become difficult.

In situations where resilient members are utilized for holding the lenses in position within the lens barrel, deformation of the elastic member as a result of forces exerted thereon by other members of the lens mounting assembly may cause the elastic member to expand inside of the effective diameter of the lens barrel and in order to avoid problems because of this it has been found necessary to enlarge the inner diameter of the lens barrel to a sufficient degree to allow for the expansion of the elastic member.

U.S. Pat. No. 3,904,276 discloses a further prior art method and device for holding lenses wherein the influence of thermal expansion and contraction of a lens barrel is compensated. In accordance with this prior art device, a deformable resilient lip is formed into one unified body with a clamping ring provided with a threaded part which is screwed into the tubular body of a lens assembly. Each lens in the assembly is arranged to be held in place by the deformable resilient lip but it has been found that the arrangement of this prior art presents a variety of problems. The device utilizes a clamping ring which is arranged in screwed engagement with a tubular body. However, arrangements of this type involve a requirement for additional machining processes and it has been found that in the structure of this prior art there is caused an increase in the dimension of the threaded part in the direction of its diameter. Furthermore, reduction in size of the parts is difficult to achieve necessitating increases in the outer diameter of the lens assembly. A further problem which arises in a method such as that of U.S. Pat. No. 3,904,276 is that the lens may be unevenly pressed in place because it will be engaged only by a resilient lip portion of a mounting member. Furthermore, in cases where the lenses in the lens assembly are spaced closely adjacent to each other it becomes necessary to hold them in place with a plurality of lenses disposed in close proximity. Since the clamping ring is provided with a threaded part which is engaged with a tubular body, the clamping ring must be made of a hard material, such as metal or the like, which will permit a threaded engagement to be established. Utilization of such hard materials could cause damage to the lenses and will also tend to reduce the economy of manufacture.

Accordingly, it is a primary aim of the present invention to provide a device for holding lenses or other optical members within an optical assembly.

A further aim of the invention is to provide means for positioning lenses or optical glass components in their respective optical reference positions.

A further aim of the invention is to provide an optical component which holds optical elements such as lenses, a filter and a mirror in a lens barrel.

It is also an object of the invention to provide means for holding optical elements of varied diameters in plase within an optical assembly.

SUMMARY OF THE INVENTION

Briefly, the present invention may be described as an optical components mounting assembly which comprises, in combination, means defining an optical axis, a holding body including means defining a reference position relative to the direction of the optical axis for an optical component to be mounted in the assembly, said holding body having an inner circumferential surface, a holding ring consisting essentially of resilient material inserted within the holding body in resilient contact against its inner circumferential surface and a tightening member operatively engaged with the holding body to apply to optical components mounted therein a mounting force in the direction of the optical axis. The resilient holding ring is formed as a discontinuous annular body having a pair of ends with a gap therebetween. This will permit the ring to be formed with a diameter larger than the diameter of the inner circumferential surface of the holding body whereby the ring may be resiliently inserted within the holding body with its terminal ends overlapping to enable the ring to be held in place by a resilient force.

Furthermore, the ring of the present invention may be formed with parts which are deformed or bent in the direction of the optical axis of the assembly. Thus, when the resilient member is placed in engagement between a pair of assembly members with forces applied thereto in the axial direction, there will be developed an added resilient force for mounting the members of the assembly. The tightening member is inserted within the holding body and it is arranged to press the resilient holding ring in the direction of the optical axis to bring one side of the holding ring into contact with the inner circumferential face of the holding body. Thus, the optical components within the assembly are maintained in their predetermined positions within the holding body.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

In order to provide a better understanding of the present invention, there will first be described in some detail the types of structural arrangements of the prior art to which the present invention relates and which are improved by virtue of the present invention.

Figure 1:
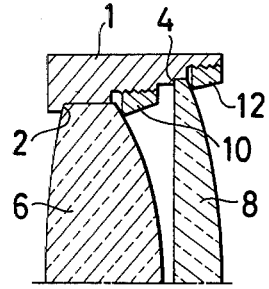
FIG. 1 is a partial sectional view showing by way of example the structure of a conventional prior art lens retaining assembly.

For example, one type of prior art structure previously mentioned is shown in FIG. 1 as comprising lenses 6 and 8 which are pressed into a predetermined lens fixing position and are fixedly retained therein by retaining rings 10 and 12 engaged within a lens carrying cylinder 1. In the case of this conventional example of prior art devices, the tightening forces of the retaining rings 10 and 12 applied to the lenses 6 and 8 tend to cause distortion of the lenses and deviation thereof from the predetermined fixed positions. Also, additional machining processes for the tightening threads are required and this in turn gives rise to a requirement for higher precision in the manufacturing techniques thereby increasing the cost of manufacture.

Figure 2:
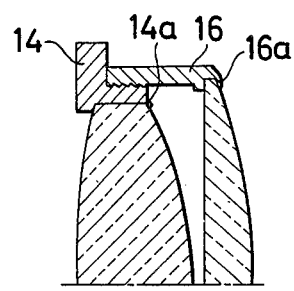
FIG. 2 is a partial sectional view of another prior art assembly technique utilizing caulking.

In FIG. 2 there is shown another example of conventional structures and techniques for fixing lenses wherein caulking is utilized. In the example of FIG. 2, end faces 14a and 16a of lens carrying cylinders 14 and 16 are caulked in order to fixedly hold the lenses in place. A drawback of this method is that a physical force is inflicted upon the lenses by the cualking process thereby tending to damage or distort the lenses. Additionally, in cases where the lens is located deep inside of the lens barrel, the caulking and assembly procedures become difficult to perform.

Figure 3A:
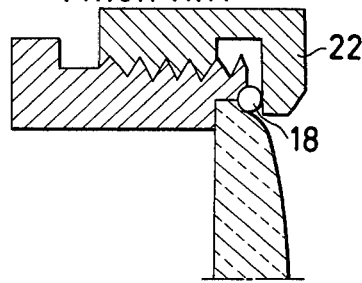
FIGS. 3(a) and 3(b) are partial sectional views showing further examples of prior art structures utilizing an elastic mounting member.
Figure 3B:
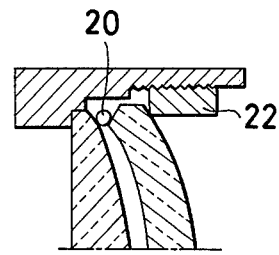

FIGS. 3(a) and 3(b) show examples of other conventional structures and methods for holding lenses wherein elastic members 18 and 20 are utilized. In these cases, however, when a lens carrying cylinder and an intermediate ring 22 are screwed into their positions thus pushing the elastic members 18 or 20, there occurs deformation of the elastic member. The tends to expand the inside of the effective diameter of the lens and in order to avoid such problems it becomes necessary to form the inner diameter of the lens barrel of a larger size sufficient to permit the expansion of the elastic member.

The prior art example of U.S. Pat. No. 3,905,276, previously mentioned herein is exemplified in FIG. 3(c). Mounted within a lens barrel 1 is a lens assembly 2 consisting of three lens members 2A, 2B and 2C. A clamping ring 5 is formed with an integral deformable resilient lip and is provided with a threaded part which is screwed into the lens barrel 1. As indicated previously, this arrangement requires additional machining processes. Furthermore, there is caused an increase in the dimension of threaded parts in the direction of the diameter. Additionally reduction in size is hampered because of the necessity for increasing the outer diameter of the lens assembly.

Figure 3C:
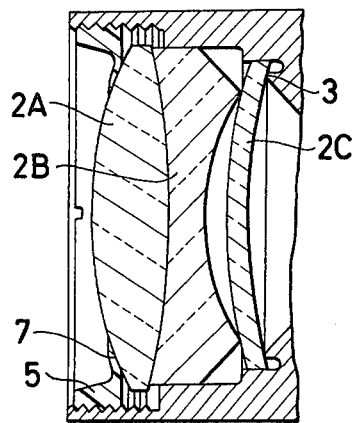
FIG. 3(c) is a partial sectional view showing a further example of a prior art structure wherein temperature compensation is provided by use of a metal clamping ring.

Since the lens of the prior art example of FIG. 3(c) is pressed only by the resilient lip portion of the clamping ring 5, it becomes unevenly held. Since the clamping ring is provided with the threaded part for maintaining the assembly together, it must be made of a hard material, such as metal in order to enable the threaded engagement to occur. Thus, there arises the possibility that the lenses of the assembly could be damaged. Furthermore, in the prior art example of FIG. 3(c), temperature compensation is effected by the use of a metallic clamping ring 7. As previously noted, there arises a greater tendency to experience undesirable lens damage and deformation.

Figure 4A:
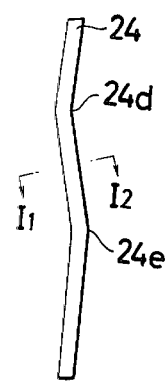
FIG. 4(a) is a side view of a resilient member which is utilized in the lens mounting assembly in accordance with the present invention.
Figure 4B:
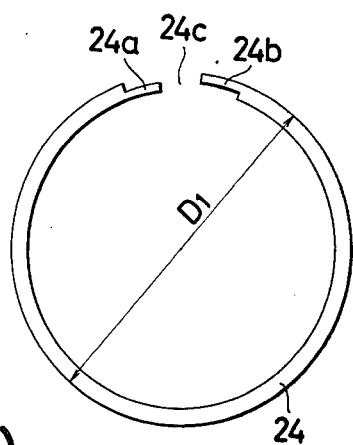
FIG. 4(b) is a plan view showing the resilient member of the invention prior to placement thereof in its assembled position inside a lens barrel.
Figure 4C:
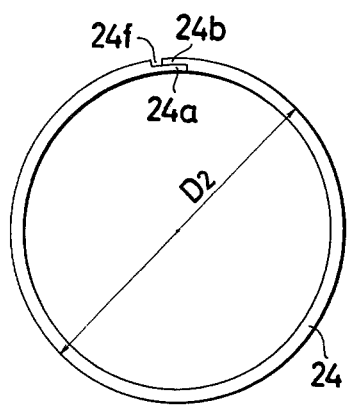
FIG. 4(c) is a plan view showing the resilient member of FIG. 4(b) after it has been placed in mounting position with its ends in overlapped relationship.

The various parts of the embodiments in accordance with the present invention are shown in FIGS. 4(a)–(g), 5, 6, 7 and 8. FIGS. 5, 6, 7 and 8 show various assemblies formed in accordance with the present invention. In each of these assemblies there is utilized a resilient retaining member of the type shown in FIG. 4(a). In FIG. 4(a), the resilient member 24 is made of a material which will enable deformation thereof when under compression and which may be used as the lens holding ring of the present invention. The resilient member 24 is shown in FIG. 4(b) in its unassembled condition before it is placed within a lens barrel. As will be apparent from FIG. 4(b), the resilient member 24 is formed as a discontinuous annular member having a pair of terminal ends 24a and 24b with a gap or space 24c formed therebetween. The outer diameter $D_1$ is made sufficiently large so that when the member 24 is placed within a lens barrel it will be radially compressed and held resiliently within the lens barrel in the position shown in FIG. 4(c) wherein the terminal ends 24a and 24b are brought into overlapping engagement as indicated in FIG. 4(c). The ends 24a and 24b may be made with a stepped configuration whereby some allowance 24f may be provided for variations in the inner diameter of the lens barrel within which the resilient member 24 is placed. With the member 24 mounted within a lens barrel, the outer diameter is then reduced to the dimension $D_2$.

Figure 4D:
FIG. 4(d) is a sectional view taken along the line $I_1$-$I_2$ of FIG. 4(a)
Figure 4E:
FIGS. 4(e), 4(f) and 4(g) are each sectional views showing by way of example the cross sectional configurations of other embodiments of the resilient member which may be utilized in accordance with the present invention.
Figure 4F:
Figure 4G:

The cross sectional configuration of the resilient member 24 is depicted in FIG. 4(d). As shown, the resilient member may have a generally rectangular configuration with rounded corners. Alternative shapes for the cross sectional configuration of the resilient member 24 are depicted in FIGS. 4(e), (f) and (g).

Additionally, as shown in FIG. 4(a) the resilient member 24 may be formed so that it will deviate or project from a flat planar configuration. As indicated in FIG. (a), the resilient member 24 is formed with bent parts 24d and 24e which protrude from a flat planar configuration in the directions of the optical axis of the assembly within which the resilient member 24 is placed. When the resilient member 24 is fixed in assembled condition, in a manner which will be described more fully hereinafter, axial forces which are applied thereto will tend to flatten the bent parts 24e and 24d and as a result there will be generated forces in the axial direction of the lens assembly contributing to the mounting function of the assembly.

Figure 5:
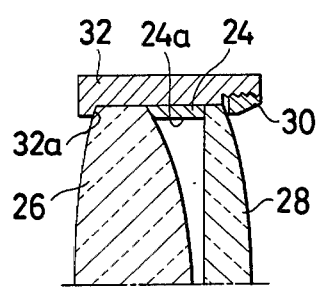
FIG. 5 is a partial sectional view showing a lens holding assembly in accordance with the invention.

An embodiment of the assembly in accordance with the present invention is shown in FIG. 5 which depicts a lens holding assembly wherein the resilient member 24 is interposed between confronting faces of a pair of lenses 26 and 28. With the resilient member assembled in the interposed position shown in FIG. 5, the lenses 26 and 28 will be held at their predetermined positions inside a holding body such as a lens carrying ring or lens barrel 32. A lens holding member 30 threadedly engages the inner circumference of the member 32 and applies an axially directed force to maintain the assembly together.

In order to assemble the device shown in FIG. 5, the lens 26 is first inserted into the carrying ring 32 to a predetermined lens contacting position 32a of the lens carrying ring 32. The shoulder or abutment 32a comprises means defining a reference position for the lens 26 and after the lens 26 is appropriately located, the engaging parts 24a and 24b of the resilient member are brought into overlapping position and the resilient member 24 is placed within the lens ring 32 to resiliently engage about the inner circumferential surface thereof. As will be noted from FIG. 5, the resilient member 24 will abut the lens 26 along outer edge portions thereof which comprise optically ineffective portions of the lens. After this, the lens 28 is brought into contact with the other side of the resilient member 24 and the lens holding member 30 is screwed to position in order to press the lens 28 against the resilient member 24. The lenses 26 and 28 thus fixedly set in their predetermined positions with the resilient member 24 interposed therebetween. The member 24 arranged along the inner circumferential surface or face of the lens carrying ring 32 will be flexibly deformed when the holding member 30 is tightened. As a result, the bent portions 24d and 24e shown in FIG. 4(a) will tend to be straightened as a result of the tightening force exerted along the direction of the optical axis of the assembly. The resilient member 24 will, of course, thereby produce a resilient reactive force in the assembly. When the lens holding member is further tightened, the resilient member 24 is further deformed in the direction of the optical axis by compression of the material of the resilient member. Thus, the sectional shape of the resilient member 24 will be, to some extent, deformed and it will tend to undertake a crescent-like configuration so that the lenses 26 and 28 will be held in place by the resilient force generated as a result of the deformation and compression of the resilient member 24.

Figure 6:
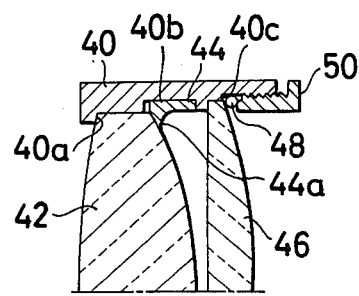
FIG. 6 is a partial sectional view showing another embodiment of the lens holding assembly of the invention.
Figure 7:
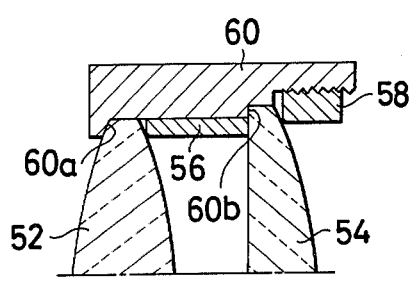
FIG. 7 is a partial sectional view showing a further embodiment of a lens holding assembly in accordance with the present invention.
Figure 8:
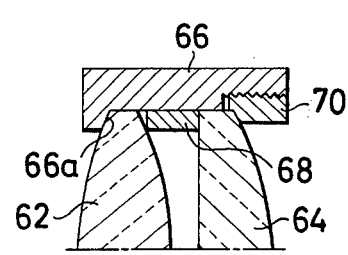
FIG. 8 is a partial sectional view showing still another embodiment of a lens assembly pursuant to the invention.

FIGS. 6, 7 and 8 show further embodiments of a lens assembly in accordance with the present invention. In the embodiment of FIG. 6, a lens 42 is pressed into position against lens reference position defining means 40a defined within a lens barrel or lens carrying cylinder 40. With the lens 42 abutting against the shoulder or reference position defining means 40a, the lens 42 will be held at its predetermined lens holding position within the lens barrel. A resilient member 44 corresponding to the member 24 is inserted into an inserting groove 40b formed within the inner circumferential surface of the lens carrying cylinder or barrel 40. The width and depth of the inserting groove 40b are determined in a manner such that, when the lens 42 is set in place and is pushed and held against the abutment 40a by the resilient member 44, the resilient member 44 will be pushed against the inner circumferential wall of the inserting groove 40b and will be bent inwardly in the direction of the optical axis in order to press the lens 42 by means of one side of the resilient member 44.

Furthermore, in order to increase the stability of the lens holding action of the device with increased contact area, the resilient member 44 is provided with a thickened part 44a at a side thereof which comes into pressed contact with the lens 42, as seen in FIG. 6.

A second lens member is arranged to be held in place by insertion of a resilient O-ring 48 between the lens 46 and an intermediate ring 50, in a manner somewhat similar to that shown in FIG. 3(a-b). It is also possible to press the lens 46 into a predetermined lens setting position within the cylinder 40 in a direct manner with the intermediate ring 50 and by tightening the ring 50. As will be noted from FIG. 6, the groove 40b is defined between a pair of end faces with the end face shown on the right side of the groove 40b, as seen in FIG. 6, having the resilient member 44 pressed thereagainst. The lens 42 is formed with the thickness of the outer peripheral edge thereof sized so as to extend beyond, or to the right of, the left end face of the groove 40b thereby creating a compressive force between the lens 42 and the right end face of the groove 40b between which the resilient member 44 is compressed.

In FIG. 7 there is shown a further embodiment of the invention wherein the resilient member is utilized in a somewhat different manner. In FIG. 7, a resilient member 56 is disposed between lenses 52 and 54 which are held adjacent each other by a balance between the resilient force of the resilient member 56 and a tightening force of a tightening ring or intermediate ring 58. One side of each of the lenses 52 and 54 is brought into contact with each of the contact parts 60a and 60b of a lens carrying cylinder or barrel 60 and the lens holding positions are determined by the positions of these contact parts 60a and 60b, respectively.

FIG. 8 shows a further embodiment of the invention wherein the resilient member is again used in a somewhat different manner. A pair of lenses 62 and 64 are held adjacent each other within a lens barrel 66 with the lens 62 being brought into contact with a contact face or abutment 66a of the lens carrying cylinder 66. A resilient member 68 which corresponds to the resilient member 24 shown in FIG. 4(a) is interposed between the two lenses 62 and 64. The lens 64 is pushed or pressed by tightening of a tightening ring 70 within the lens barrel 66 in order to resiliently hold the lenses 62 and 64 in place by the resilient action of the resilient member 68.

In each of the resilient members shown in FIGS. 5, 6, 7 and 8 pursuant to the present invention, there are provided engaging parts similar to the parts 24a and 24b shown in FIG. 4(b) and arranged in a manner adapted to the mode of utilization described herein. If it is desired to reduce the manufacturing cost of the lens holding device, the engaging parts may be dispensed with. Furthermore, the length of the resilient member may be extended in order thereby to enhance the versatility of the resilient member by making it useful in different lens barrels having varied inside diameters. Thus, the longer resilient member may then be cut to a precise length which may be required for a particular application involving a specific inner diameter for the lens barrel.

Utilization of a resilient member in accordance with the present invention, such as the resilient member 24 shown in FIGS. 4(a)-(c), employed in each of the lens holding assemblies depicted in FIGS. 5, 6, 7 and 8, will give rise to several significant advantages. First of all, the outside diameter $D_1$ of the resilient member 24 before it is placed within a lens barrel is formed to be somewhat larger than the inner diameter of the lens carrying device which has the cylinder 32. When inserting the resilient member into the cylinder 32, terminal ends such as engaging parts 24a and 24b are brought into engagement with each other and they may be brought into overlapping condition. With this arrangement, the allowance 24f which is provided will permit sufficient deformation of the resilient member occurring in the direction of its radial dimension to permit adjustment of balance between the resilient member 24 and the reactions of the lenses 26 and 28 and that of the lens carrying cylinder 32 for holding the lenses 26 and 28 in place.

With the allowance 24f provided for engagement between the engaging parts 24a and 24b, the resilient member will be prevented by this adjustable arrangement of engagement from being excessively displaced into the effective diameter areas of the lenses 26 and 28.

Since one side of each of the lenses 26, 28 (or 52, 54, or 62, 64) is in contact with the resilient member 24 (or 56 or 68), the lenses are effectively protected from this distortion, dislocation, or from being caused to move into the wall of the lens carrying cylinder and thereby being damaged when excessive force is applied thereto.

The resilient member 24 is provided with a plurality of bent parts 24d and 24e arranged to extend or protrude therefrom in directions parallel to the optical axis of the lens. Therefore, when the resilient member 24 is placed within a lens barrel, the protrusions of the bent parts of the resilient member will come into contact with the lenses and thereby the resilient member is prevented from engaging or contacting the entire contacting area of each lens. The lens holding force can therefore be adjusted by change of the direction in which the bent parts of the resilient member extend even when the distances from predetermined reference positions in the lens carrying cylinder 32 to the positions in which the lenses 26 and 28 have not been precisely set by machining.

Inasmuch as each lens is held at a plurality of points by the protrusions of the bent parts of the resilient member, as mentioned above, the resilient member 24 may be arranged to have greater resilience than would otherwise arise if the lens were arranged to be held on the entire contacting face thereof. This provides a larger holding force and enhances the lens holding stability.

Furthermore, by providing the inner face of the resilient member 24 with notches having a reflection preventing shape, unnecessary exterior light may be prevented from entering.

With the resilient member disposed along the inner circumferential face of the lens carrying ring, the resilient member may be placed inside the lens barrel without being displaced from the set position. This will overcome problems of dislocation that have been experienced during assembly processes in accordance with conventional methods.

The resilient member used for the lens holding assembly of the invention may be made from elastic material such as rubber, synthetic resin, and the like. In cases where the resilient member is to be provided with engaging parts such as the parts 24a and 24b, these engaging parts may be formed to have a longer shape than would ordinarily be necessary and they may, at the time of use thereof, be cut into suitable lengths in accordance with the size of the lens barrel within which the resilient member is to be applied. Such an arrangement will enhance the versatility of the resilient member and permit use thereof in lens barrels of different sizes.

A further advantage achieved by the present invention involves the fact that the flexible member is flexible or deformable in two stages or phases. That is, one aspect of the resiliency of the resilient member involves axial compression thereof to straighten the bent parts such as the parts 24d and 24e. The other aspect of the deflection which occurs involves compression of the material of the resilient member whereby the cross sectional configuration thereof may tend to assume a generally crescent-like shape. The fact that these two stages of deformation occur provides for greater control than would otherwise be possible in the positioning and support of the lenses.

As a result of the present invention, many of the disadvantages of the prior art devices discussed previously herein are overcome and avoided.

While specific embodiments of the invention have been shown and described in detail to illustrate the application of the inventive principles, it will be understood that the invention may be embodied otherwise without departing from such principles.

What is claimed is:

1. An optical components mounting assembly comprising, in combination: means defining an optical axis; a holding body including means defining a reference position relative to the direction of said optical axis for an optical component mounted in said assembly, said holding body having an inner circumferential surface; a holding ring consisting essentially of resilient material inserted within said holding body in resilient contact against said inner circumferential surface, said ring being formed as a discontinuous body having an overlapping portion with engageable steps, said discontinuous body having a pair of ends at said overlapping portion with a gap therebetween and with parts thereof bent in the direction of said optical axis for imparting a resilient effect to press said optical component; and a tightening member operatively engaged with said holding body to apply to an optical component mounted therein a mounting force applied in the direction of said optical axis said tightening member being inserted inside of said holding body and being arranged to press said holding ring in the direction of said optical axis to bring one side of said holding ring into contact with the inner circumferential face of said holding body thereby to maintain said optical components in their predetermined positions with said holding body.

2. An optical components mounting assembly comprising, in combination: means defining an optical axis; a holding body including means defining a reference position relative to the direction of said optical axis for optical component means mounted in said assembly, said holding body having an inner circumferential surface; a holding ring consisting essentially of resilient material inserted within said holding body in resilient contact against said inner circumferential surface; said holding ring comprising a discontinuous annular body having a pair of ends formed with a stepped configuration with parts of said discontinuous annular body intermediate said ends bent to protrude in the direction of said optical axis to impart a resilient force axially of said assembly to said optical component means mounted in said assembly, said holding ring being dimensioned to resiliently effect overlapping of said pair of stepped ends when said holding ring is placed within said circumferential surface of said holding body; and a tightening member operatively engaged with said holding body to apply to said optical component means a mounting force at least in the direction of said optical axis; said tightening member being inserted inside of said holding body and being arranged to press said holding ring in the direction of said optical axis to bring one side of said holding ring into contact with the inner circumferential surface of said holding body thereby to maintain said optical component means in predetermined position within said holding body.

3. An optical components mounting assembly comprising in combination: means defining an optical axis; an optical components holding tube including means defining a reference position relative to the direction of said optical axis for an optical component, said holding tube including an inner circumferential surface having formed therein groove means with at least a pair of end faces spaced apart in the direction of said optical axis, said means defining said reference position comprising one of said end faces; optical component means mounted in said assembly including at least one optical component held at said reference position within said holding tube; and a holding ring made from resilient material and having a discontinuous annular configuration with a pair of ends formed with a stepped configuration with parts of said discontinuous annular ring intermediate said ends bent to protrude in the direction of said optical axis to impart a resilient force axially of said assembly to said optical component means, said holding ring being dimensioned to resiliently effect overlapping of said pair of stepped ends when said holding ring is placed within said groove means; said holding ring and said optical component being positioned with parts thereof lying in axial juxtaposition between said end faces of said groove means with said holding ring abutting against the other of said end faces and with said optical component being held against said one of said end faces in resilient compression; said end faces being spaced apart a distance to enable said holding ring to maintain said optical component within said groove means against said one of said end faces in resilient compression to hold said optical component at said reference position within said holding tube by the resilient force of said ring.

* * * * *